(12) United States Patent
Felton

(10) Patent No.: US 9,437,897 B2
(45) Date of Patent: Sep. 6, 2016

(54) POLAR SOLVENT BASED DEVICE FOR STORAGE AND THERMAL CAPTURE OF ELECTRICAL ENERGY

(71) Applicant: GREEN-ON-GREEN ENERGY, INC., Edmonds, WA (US)

(72) Inventor: Samuel P. Felton, Shoreline, WA (US)

(73) Assignee: GREEN-ON-GREEN ENERGY, INC., Edmonds, WA (US)

( * ) Notice: Subject to any disclaimer, the term of this patent is extended or adjusted under 35 U.S.C. 154(b) by 265 days.

(21) Appl. No.: 13/771,970

(22) Filed: Feb. 20, 2013

(65) Prior Publication Data

US 2014/0234694 A1 Aug. 21, 2014

Related U.S. Application Data

(60) Provisional application No. 61/765,207, filed on Feb. 15, 2013.

(51) Int. Cl.
*H01M 10/04* (2006.01)

(52) U.S. Cl.
CPC .................. *H01M 10/0413* (2013.01)

(58) Field of Classification Search
CPC .................................. H01M 10/0413
USPC ........................ 429/149, 209, 188, 211, 51
See application file for complete search history.

(56) References Cited

U.S. PATENT DOCUMENTS

| | | | |
|---|---|---|---|
| 5,838,015 | A | 11/1998 | Burdick et al. |
| 6,024,848 | A | 2/2000 | Dufner et al. |
| 8,278,876 | B2 | 10/2012 | Bucur et al. |
| 8,883,351 | B2 * | 11/2014 | Todoriki ............ H01G 11/22 205/57 |
| 2002/0154469 | A1 | 10/2002 | Shiue et al. |
| 2008/0050632 | A1 | 2/2008 | Salter et al. |
| 2009/0226798 | A1 | 9/2009 | Pollack |
| 2012/0067390 | A1 | 3/2012 | Pollack |
| 2012/0282530 | A1 | 11/2012 | Chiang et al. |

OTHER PUBLICATIONS

Chai, et al., "Effect of Radiant Energy on Near-Surface Water," J. Phys Chem B 113(42); Oct. 22, 2009; pp. 13953-13958; copy obtained from http://www.nci.nlm.nih.gov/pmc/articles/PMC2843558/, 9 pages.

(Continued)

*Primary Examiner* — Stewart Fraser
*Assistant Examiner* — Rachel L Zhang
(74) *Attorney, Agent, or Firm* — Davis Wright Tremaine LLP; Heather M. Colburn

(57) ABSTRACT

A novel electrical energy storage system that includes one or more cells. Each cell includes a polar liquid, a negatively-charged-surface electrode, and a positively-charged surface electrode. An interstitial space is defined between the electrodes. The negatively-charged-surface electrode has a hydrophilic surface adjacent the interstitial space. The liquid includes a self-organizing zone in the interstitial space. Each cell includes means to increase and/or decrease electrical potential between the electrodes. Increasing the electrical potential between the electrodes induces expansion of the self-organizing zone in the interstitial space. Decreasing electrical potential between the electrodes (e.g., via current discharge through an external load) causes a contraction of the self-organizing zone.

28 Claims, 4 Drawing Sheets

(56) References Cited

OTHER PUBLICATIONS

Chai, et al., "Solute-Free Interfacial Zones in Polar Liquids," J Phys Chem B 114(16); Apr. 29, 2010, pp. 5371-5375; obtained from http://www.ncbi.nlm.nih.gov/pmc/articles/PMC2865192/ , 8 pages.

Chen, et al., "Force field measurements within the exclusion zone of water," J Biol Phys 38(1); Jan. 2012; pp. 113-120; obtained at http://link.springer.com/article/10.1007%2Fs10864-011-9237-5?Ll=true , 4 pages.

Ovchinnikova, et al., "Can Water Store Charge?" Langmuir, 25(1); 2009; published online on Nov. 24, 2008; pp. 542-547.

Zheng, et al., "Long-range forces extending from polymer-gel surfaces," white paper published by University of Washington Department of Bioengineering and in Phys Rev E 68; 2003; pp. 1-14.

Zheng, et al., "Surfaces and interfacial water: Evidence that hydrophilic surfaces have long-range impact," Advances in Colloid and Interface Science 127, Sep. 6, 2006, pp. 19-27.

International Search Report and Written Opinion of the International Search Authority for International Application No. PCT/US14/16553, mailed on May 19, 2014.

* cited by examiner

POLAR SOLVENT BASED DEVICE FOR STORAGE AND THERMAL CAPTURE OF ELECTRICAL ENERGY

CROSS REFERENCE TO RELATED APPLICATION(S)

This application claims the benefit of U.S. Provisional Application No. 61/765,207, filed on Feb. 15, 2013, which is incorporated herein by reference in its entirety.

BACKGROUND OF THE INVENTION

1. Field of the Invention

The present invention is in the field of electrical and electronic devices; more particularly, the technical field of electrical energy storage and capture devices.

2. Description of the Related Art

Reliable, long-lasting, quick-cycle electricity storage is a missing piece of modern smart-grid infrastructure puzzle. Lack of such storage capability is the reason that electrical energy's utilization pattern has largely been a contemporaneous generator-to-load, closed loop since its characterization in the $17^{th}$ century. Efficient storage of electrical potential has remained an elusive, yet desirable, goal.

Early discoveries in chemistry and physics led to the development of devices such as the Leyden jar (essentially an air-gap capacitor), and electrolytic batteries, which utilize ionic-exchange chemical reactions to induce electro-motive force ("EMF") in submerged metallic electrodes.

These solutions, while not perfect, have yet allowed the use of electrical energy at times and in locations where immediate generation was not possible. However, for large-scale (especially grid-scale) storage and use, both batteries and capacitors have some serious drawbacks. Batteries have a very short lifespan in terms of charge-discharge cycles (currently, less than 10,000), some have charge-memory, some are very heavy, and nearly all are made with toxic and/or environmentally harmful chemistries. Capacitors have a long lifespan but suffer charge leakage and have a very low capacity compared to batteries.

The hunt for a clean and long-lived solution to these issues is the subject of research and development on a global scale. Unfortunately, some of the best solutions discovered so far use some very toxic chemistries, have high operating temperature ranges (over 100° C.), or are very expensive and difficult to maintain. Some (like Li-Ion) even have fire-safety risks.

Therefore, the need exists for electrical energy storage which is long-lived, inexpensive to maintain, safe and environmentally sound (not to mention, rapid to charge and discharge).

BRIEF DESCRIPTION OF THE SEVERAL VIEWS OF THE DRAWING(S)

DETAILED DESCRIPTION OF THE INVENTION

All publications cited herein are incorporated by reference to the same extent as if each individual publication was specifically and individually indicated to be incorporated by reference.

A recently-characterized, but previously-observed physical phenomenon known informally as "hydrophilic exclusion zone," "HEZ," or "EZ" naturally forms in aqueous solutions, under certain conditions. See Zheng, J M and Pollack, G H: Long-range forces extending from polymer-gel surfaces, *Phys. Rev.* E 68, 031408 (2003); and Zheng J M, Chin W C, Khijniak E, Khijniak E Jr, Pollack G H: Surfaces and interfacial water: evidence that hydrophilic surfaces have long-range impact, *Adv Colloid Interface Sci.* 2006 Nov. 23;127(1):19-27. This region, in which water in contact with a certain hydrophilic surfaces, will self-organize into a crystal-like structure. Nagornyak, E, Yoo, H and Pollack, GH: Mechanism of attraction between like-charged particles in aqueous solution, *Soft Matter,* 5, 3850-3857, 2009. The water molecules in this structure are densely-packed, extending many thousands of molecule-lengths away from the material. Resulting physical effects of this formation include exclusion of solutes, particulates, and even $H^+$ charges away from the organized (EZ) zone. An influx of electrical or narrowband infrared energy into this system increases the size of the HEZ and the concomitant charge-density of $H^+$-induced the outside of the zone. See Ovchinnikova, K and Pollack, G H: Can water store charge?, *Langmuir,* 25: 542-547, 2009; and Chai, B, Yoo, H. and Pollack, GH: Effect of Radiant Energy on Near-Surface Water, *J. Phys. Chem.* B 113: 13953-13958, 2009.

When current is drained from the device, the HEZ shrinks, but never completely dissipates, holding a residual charge as well.

Figure 1:
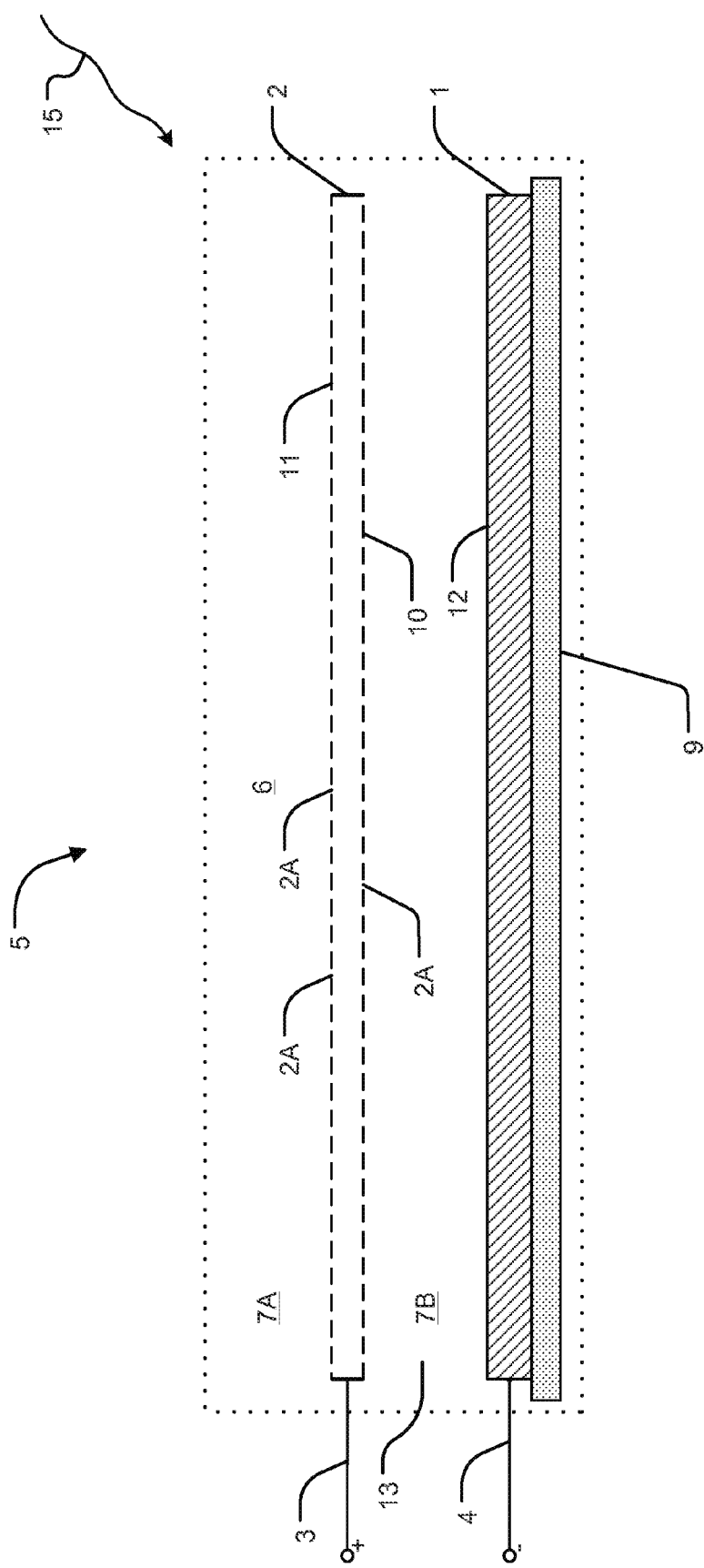
FIG. 1 is a lateral cross-sectional view of a single cell, showing active and passive elements of the cell.
Figure 2:
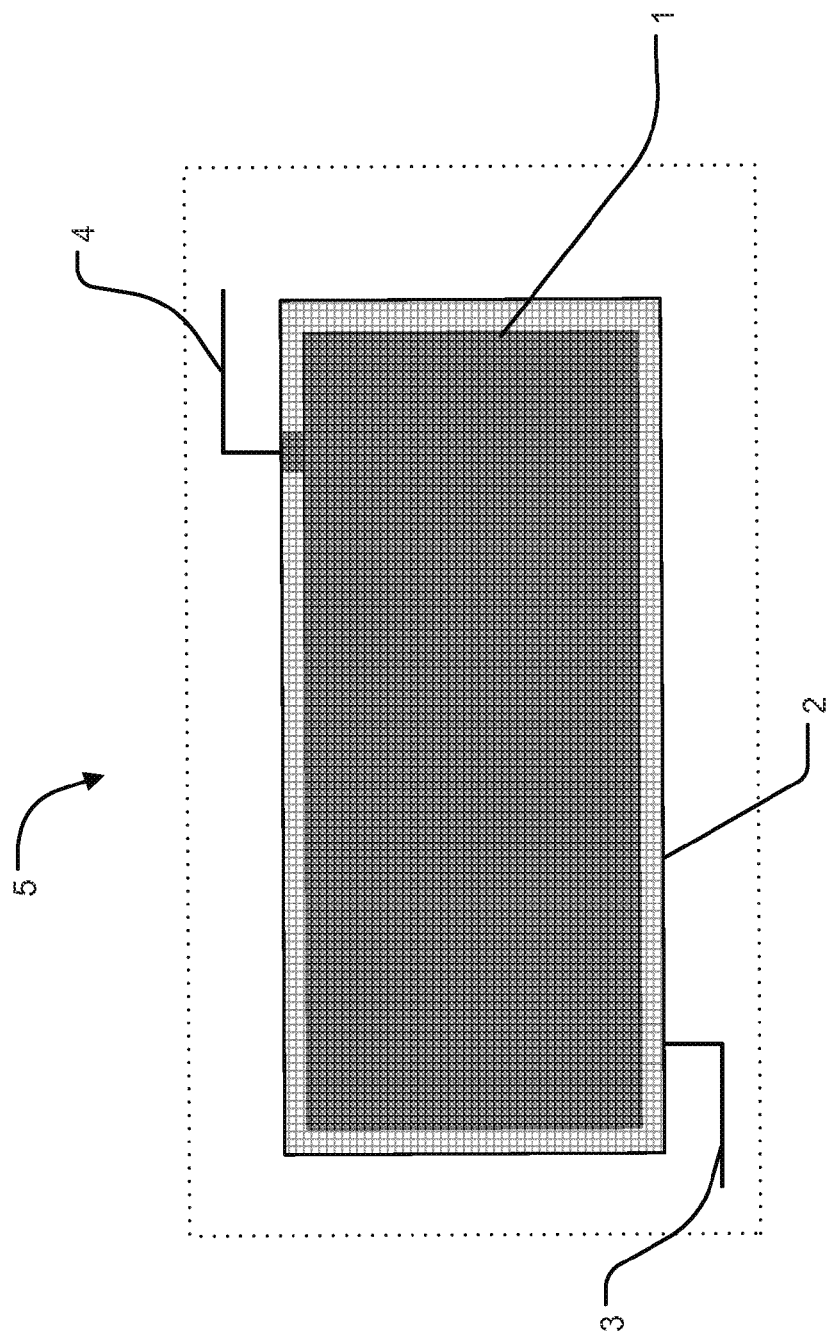
FIG. 2 is a front view of the cell of FIG. 1.
Figure 3:
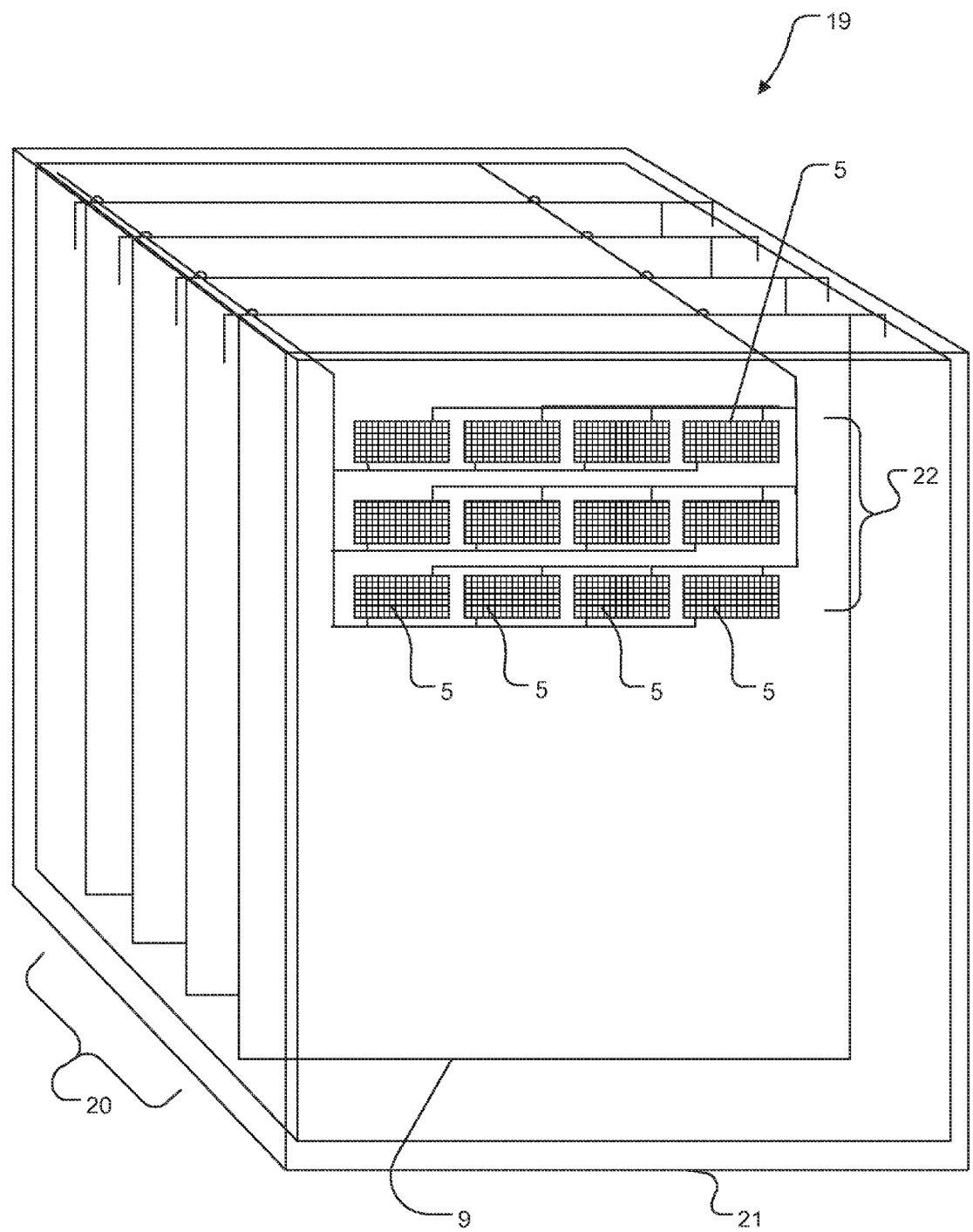
FIG. 3 is a perspective view of a container holding sheets of cells each like the cell shown in FIG. 2.

FIG. 1 is a lateral cross-section of an electrical energy storage cell 5, which may be incorporated in a battery 19 (see FIG. 3). As will be described in greater detail below, the battery 19 may include one or more cells like the cell 5. The cell 5 utilizes the electrical polarization of either side of the HEZ, and its concomitant EMF, to extract charge from the system and thus power electrical devices and circuitry.

The cell 5 includes a cathode electrode 1, an anode electrode 2, and a polar solution 6.

The cathode electrode 1 has an upper hydrophilic surface 12. The cathode electrode 1 may be constructed from any hydrophilic and highly-electrically-conductive material. For example, the cathode electrode 1 may be constructed from a hydrophilic polymer in which carbon nanotubes, buckypaper, graphene sheets, other planar or matrix, metallic or non-metallic, conductive nanostructures have been imbedded. By way of a non-limiting example, suitable polymers from which the cathode electrode 1 may be constructed include nafion, polyvinyl alcohol, a combination thereof, and the like. Thus, the upper hydrophilic surface 12 may, in this example, be characterized as being both hydrophilic and semi-porous.

Optionally, the cathode electrode 1 is positioned on and supported by a substrate 9. However, this is not a requirement. The substrate 9 may be non-conductive and rigid. By way of a non-limiting example, the substrate 9 may be constructed from a semi-rigid, non-hydrophilic plastic material.

The anode electrode 2 has a first surface 10 opposite a second surface 11. By way of non-limiting example, the anode electrode 2 may include a plurality of pores 2A through which the solution 6 may flow freely. However, in alternate embodiments, the pores 2A may be omitted. For example, if the anode electrode 2 is constructed of a material that is thin and lightweight (e.g., having a density equal to or less than about 4.5 mg/cm$^2$ as a non-limiting example), it will not necessarily require porosity as long as the solution 6 is free to flow around the anode electrode 2. By way of another non-limiting example, the anode electrode 2 may include through-holes, through-slots, and/or other types of pathways that extend between the first and second surfaces 10 and 11 and are configured to allow a portion of the solution 6 to flow through the anode electrode 2.

The anode electrode 2 is configured to maintain structural integrity while in contact with the solution 6. The anode electrode 2 is electrically isolated from the cathode 1. In the embodiment illustrated, the anode electrode 2 floats above and is neither attached to the cathode electrode 1 nor to any of the structures in direct contact with the cathode electrode 1. In alternate embodiments, the anode electrode 2 may be attached along at least a portion of its periphery to the substrate 9 supporting the cathode 1, while yet maintaining electrical isolation from the cathode 1. In some embodiments, the anode electrode 2 is flexible. The anode electrode 2 may be constructed from a highly-conductive, light, yet rigid aerogel material. As with the conductive parts of the cathode electrode 1, the anode electrode 2 may optionally be constructed from carbon nanotubes, buckypaper, graphene sheets, other planar or matrix, metallic or non-metallic, conductive nanostructures. Such conductive materials may be embedded in the aerogel material, a polymer, and the like.

The cathode electrode 1 and the anode electrode 2 are submerged in the solution 6. The solution 6 may be characterized as having a first portion 7A and a second portion 7B. The first portion 7A is adjacent the second surface 11 of the anode electrode 2. A gap 13 is defined between the upper hydrophilic surface 12 of the cathode electrode 1 and the first surface 10 of the anode electrode 2. The gap 13 forms when the cell 5 is filled with the solution 6. The second portion 7B resides in the gap 13 and is therefore adjacent the first surface 10 of the anode electrode 2 and the upper hydrophilic surface 12 of the cathode electrode 1.

The anode electrode 2 is configured to move and/or flex in at least one dimension. This moving and/or flexing allows a distance between the first surface 10 of the anode electrode 2 and the upper hydrophilic surface 12 of the cathode electrode 1 to change to thereby change the size of the gap 13. When the size of the gap 13 changes, the volume of the second portion 7B of the solution 6 residing in the gap 13 also changes. For example, when the gap 13 contracts, at least a portion of the second portion 7B of the solution 6 may be forced from inside the gap 13 (e.g., through the pores 2A) into the first portion 7A. Similarly, when the gap 13 expands, at least a portion of the first portion 7A of the solution 6 may flow into the gap 13 (e.g., via the pores 2A).

Contact with the upper hydrophilic surface 12 of the cathode electrode 1 causes the second portion 7B in the gap 13 to change state and self-order, forming an exclusion-zone ("EZ"). On the other hand, the first portion 7A of the solution 6 is generally unordered and in a higher entropic state than that of the ordered second portion 7B. As the structure forming the EZ self-assembles in the gap 13, the molecules in the second portion 7B of the solution 6 form a tightly-packed crystalline lattice. Solutes, precipitates, and other suspended solids are forcibly excluded from the second portion 7B of the solution 6, including the material composing the anode electrode 2 structure. This exclusion of the anode electrode 2 causes the anode electrode 2 to be forced out of the gap 13, placing the anode electrode 2 within but at the immediate near-edge of the unordered first portion 7A of higher H$^+$ potential, thus providing a positive charge relative to the exclusion-zone itself The solution 6 may be implemented using either protic or aprotic polar liquids, such as water, alcohol, formic acid, dimethylsulfoxide ("DMSO"), ethanol, methanol, propylene carbonate, a combination thereof, and the like. It may be desirable to use liquids having high dielectric constants, such as de-ionized water. In order to prevent freezing, an admixture of polar reagents may be used, such as, but not limited to, ethanol and water.

Optionally, the electrically conductive leads 3 and 4, which by non-limiting example may be constructed from copper metallic, or other conductive material, are connected to the cathode electrode 1 and the anode electrode 2, respectively. The conductive leads 3 and 4 may be plated, soldered or otherwise electrically bonded to the cathode electrode 1 and the anode electrode 2, respectively.

When first introduced, the solution 6 flows into porous areas (e.g., the pores 2A of the anode electrode 2) and vacant areas (e.g., the gap 13) in the cell 5. Upon contact with the upper hydrophilic surface 12 of the cathode electrode 1, the second portion 7B of the solution 6 in contact with the upper hydrophilic surface 12 of the cathode electrode 1 will self-order as previously described. This activity forces solutes, precipitates, and suspended solids (such as the anode electrode 2) out of the gap 13 of the ordered second portion 7B of the solution 6. In conjunction with the formation of the ordered second portion 7B in the gap 13 and as is common in polar crystalline structures, the ordered second portion 7B of the solution 6 becomes polarized.

Either of the following two conditions may cause the ordered second portion 7B in the gap 13 to expand in a converse linear fashion to the unordered first portion 7A of the solution 6:

1. the application of polarity-correct direct current across the positive lead 3 attached to the anode electrode 2 and the negative lead 4 attached to the cathode electrode 1; or
2. incident, infra-red radiation 15 in the wavelength band as described in Chai, B, Yoo, H. and Pollack, GH: Effect of Radiant Energy on Near-Surface Water, *J. Phys. Chem.* B 113: 13953-13958, 2009.

When the volume of the ordered second portion 7B expands with respect to the volume of the unordered first portion 7A, the charge differential formed in proximity of ordered second portion 7B and unordered first portion 7A of the solution 6 creates an electrical potential between the positive lead 3 and the negative lead 4.

Incoming, polarity-correct direct current of a higher potential than that of the anode and cathode electrodes 2 and 1 may be applied across the leads 3 and 4.

Alternatively, when connected to any external load (not shown), the potential across the leads 3 and 4 will discharge through the load.

Figure 4:
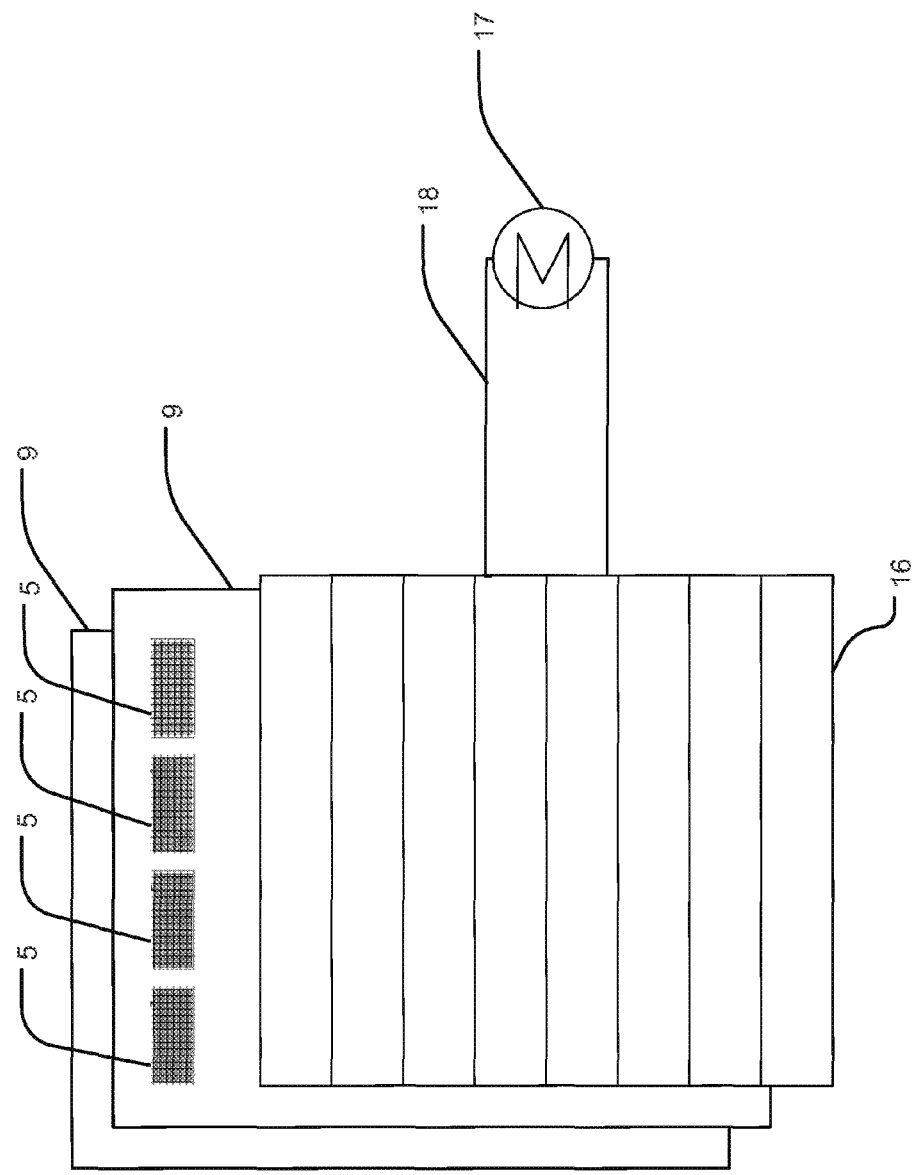
FIG. 4 is a front view of sheets of cells each like the cell shown in FIG. 2 with additional infrared heat exchanger assemblies.

Turning to FIG. 4, optionally, heat exchanger plates 16 may be interleaved between assemblies of multiple cells 5 arranged on adjacent substrates 9. The heat exchanger plates 16 may optionally be connected to any of a number of external heat exchanger devices 17 via incoming and outgoing heat-conduction elements 18, including but not in any way limited to heat pipe, infrared-conductive optical tubing, etc.

FIG. 3 is a perspective view of the composite battery 19 that includes an array 20 of substrates 9 arranged in a container 21. An array 22 of the cells 5 is mounted on each of the substrates 9. In this embodiment, each of the substrates 9 may be configured as a sheet.

The cells 5 in each of the arrays 22 are, purely by example, combined in a series-parallel electrical arrangement, so as to create the necessary voltage and amperage for a given application. Each of the substrates 9 of the array 20 may be subsequently connected together in a parallel, to increase amperage for a given application. However, as is apparent to those of ordinary skill in the art, the substrates 9 of the array 20 may alternatively be connected in series. Further, selected ones of the substrates 9 may be connected in series while others are connected in parallel.

The container 22 is filled with the solution 6 prior to use.

The substrates 9 shown in FIG. 3 may be constructed from any sufficiently hydrophobic material, that is both high strength and electrically non-conductive.

The container 21 may be constructed from any hydrophobic material, having sufficient strength to hold the solution 6 in the quantity desired without leakage or deformation. The container 21 is either electrically non-conductive or coated with a hydrophobic, non-electrically-conductive material and electrically isolated from the active electronic components of the battery 19.

Depending on the implementation details, the battery 19 may be simple to construct and easy to transport when empty. When placed in use, the battery 19 may be filled with clean, deionized or filtered water and sealed. The battery 19 may be drained and refilled in situ to ensure cleanliness of the solution 6.

The battery 19 may be configured to withstand many hundreds of thousands of charge-discharge cycles without significant mechanical or electrical deterioration.

An electrical energy storage device has been described above. The device may include a containment vessel, a porous, hydrophilic cathode electrode, a lightweight, porous anode electrode, a protic or aprotic polar liquid, a first conductor, and a second conductor. Optionally, the anode electrode may be free to move in at least one dimension. The liquid may include a first portion positioned between the cathode electrode and the anode electrode, in direct contact with both. The liquid may also include a second portion in contact with and covering a distance between the anode electrode and the edge of the containment vessel. The first conductor is electrically connected to the cathode electrode, and configured to allow electrical current to move into and out of the device. The second conductor is electrically connected to the anode electrode, and configured to allow electrical current to move into and out of the device. Optionally, the device may include an optional attached electrical switch device that allows one way current flow in either direction through the attached anode electrode. Multiple devices may be arranged in such a way as to allow them to be electrically connected in either series or parallel or some combination thereof, to achieve a desired voltage and amperage. When multiple devices have been arranged to achieve a desired voltage and amperage, infrared-capable waveguides, into which infrared energy may be introduced, may be used to capture charge.

A framework containing individual cells for the storage and retrieval of electrical energy has been described above. Each cell may include a thin layer of a hydrophilic compound, within which is embedded or otherwise suspended a very thin, highly electrically-conductive material. The porous, electrically-conductive material forms a cathode. Each cell may also include a second, suspended, thin, and highly electrically conductive porous surface for use as an anode. Electrically conductive lead material drains and replenishes direct-current electrical energy to and from the aforementioned cells. Any polar liquid, such as water, formic acid, dimethylsulfoxide, ethanol, or propylene carbonate may be used. Optionally, a heat-exchange apparatus may be used to conduct infrared energy to and from the outside of the device's container and the interior. The transfer material should be non-electrically-conductive if possible. However, if this is not possible, the exchanger may be produced from metallic or conductive materials that should be electrically isolated from all other electrically conductive componentry (floating). As described above, the external container may hold multiple frameworks and switch devices. The container may be either composed of or lined with a non-conducting, non-hydrophilic, watertight material, with drain and filling tubing.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An electrical energy storage device comprising:
a cathode electrode comprising graphene sheets;
an anode electrode comprising graphene sheets, the anode electrode having a first side opposite a second side, the anode electrode being spaced apart from the cathode electrode to define a gap between the first side of the anode electrode and the cathode electrode, an electrical potential existing between the anode electrode and the cathode electrode, at least one of the cathode electrode and the anode electrode being porous; and
a protic or aprotic dielectric polar liquid comprising a gap portion positioned in the gap and a reservoir portion positioned adjacent the second side of the anode electrode, wherein adding energy to at least one of the cathode electrode, the anode electrode, and the liquid causes at least a first portion of the liquid to flow from the reservoir portion into the gap portion, the first portion of the liquid contacting the cathode electrode and self-ordering upon contact with the cathode electrode to (a) form an exclusion zone devoid of solutes, precipitates, and suspended solids, and (b) increase the electrical potential between the anode electrode and the cathode electrode.

2. The device of claim 1 for use with a load impedance, wherein the anode electrode and the cathode electrode are configured to be connected to the load impedance and when so connected, to discharge current through the load impedance, and
at least a second portion of the liquid flows from the gap portion into the reservoir portion when the current is discharged.

3. The device of claim 1, wherein the cathode electrode is hydrophilic.

4. The device of claim 1, wherein the cathode electrode is porous.

5. The device of claim 1, wherein the anode electrode has a density equal to or less than about 4.5 mg/cm$^2$.

6. The device of claim 1, wherein the anode electrode comprises pathways configured to permit the liquid to flow therethrough.

7. The device of claim 6, wherein the pathways comprise a plurality of pores.

8. The device of claim 1, wherein the anode electrode is movable with respect to the cathode electrode, the first portion of the liquid pushing the anode electrode farther away from the cathode electrode thereby enlarging the gap.

9. The device of claim 1, wherein the anode electrode is flexible, the first portion of the liquid causing the anode electrode to flex away from the cathode electrode to thereby enlarge the gap.

10. The device of claim 1, wherein the liquid comprises at least one of water, formic acid, dimethylsulfoxide, ethanol, methanol, and propylene carbonate.

11. The device of claim 1, further comprising:
a first conductor electrically connected to the cathode electrode; and
a second conductor electrically connected to the anode electrode, the first and second conductors being configured to transfer electrical current into and out of the device.

12. The device of claim 11, further comprising:
an electrical switch device connected to the second conductor, the electrical switch device being configured to determine whether the electrical current flows into or out of the device.

13. The device of claim 1, wherein the energy is added to the liquid, and the device further comprises:
an infrared energy exchanger assembly configured to provide infrared energy to the liquid, the energy added to the liquid being infrared energy.

14. The device of claim 1, further comprising:
a first conductor electrically connected to the cathode electrode; and
a second conductor electrically connected to the anode electrode, the electrical potential being reduced between the anode electrode and the cathode electrode by transferring electrical current from the cathode electrode and the anode electrode via the first and second conductors, respectively.

15. The device of claim 1, wherein the energy is added to the anode electrode and the cathode electrode, and the device further comprises:
a first conductor electrically connected to the cathode electrode; and
a second conductor electrically connected to the anode electrode, the energy added to the anode electrode and the cathode electrode being electrical current transferred to the cathode electrode and the anode electrode by the first and second conductors, respectively, the electrical potential between the anode electrode and the cathode electrode being reduced when electrical current is transferred from the cathode electrode and the anode electrode via the first and second conductors, respectively.

16. The device of claim 1, wherein the liquid is free of solutes, precipitates, and suspended solids.

17. An assembly comprising:
a plurality of devices mounted on a common hydrophobic substrate; and
a plurality of traces interconnecting selected ones of the plurality of the devices, each of the plurality of devices comprising:
a cathode electrode comprising graphene sheets;
an anode electrode comprising graphene sheets, the anode electrode having a first side opposite a second side, the anode electrode being spaced apart from the cathode electrode to define a gap between the first side of the anode electrode and the cathode electrode, an electrical potential existing between the anode electrode and the cathode electrode; and
a protic or aprotic polar liquid comprising a gap portion positioned in the gap and a reservoir portion positioned adjacent the second side of the anode electrode, wherein adding energy to at least one of the cathode electrode, the anode electrode, and the liquid causes at least a first portion of the liquid to flow from the reservoir portion into the gap portion, the first portion of the liquid contacting the cathode electrode and self-ordering upon contact with the cathode electrode to (a) form an exclusion zone devoid of solutes, precipitates, and suspended solids, and (b) increase the electrical potential between the anode electrode and the cathode electrode.

18. The assembly of claim 17, further comprising:
a plurality of infrared waveguides configured to receive infrared energy and conduct at least a portion of the infrared energy received to the liquid of each of at least a portion of the plurality of devices.

19. The assembly of claim 17, wherein the liquid is free of solutes, precipitates, and suspended solids.

20. An electrical energy storage device comprising:
   a polar solution;
   a hydrophilic first electrode comprising graphene sheets, the first electrode being at least partially submerged in the solution;
   a second electrode comprising graphene sheets, the second electrode being at least partially submerged in the solution, at least one of the first and second electrodes being porous;
   an exclusion zone defined between the first and second electrodes, the solution comprising an exclusion zone portion positioned in the exclusion zone alongside the first electrode, the exclusion zone portion self-ordering into a polarized crystalline structure devoid of solutes, precipitates, and suspended solids, the solution further comprising a reservoir zone portion positioned outside the exclusion zone, the exclusion zone portion and the reservoir zone portion each having a volume; and
   an electrical potential between the first and second electrodes, wherein increasing the electrical potential causes the volume of the exclusion zone portion to increase, and the volume of the reservoir zone portion to decrease.

21. The device of claim 20, wherein decreasing the electrical potential causes the volume of the exclusion zone portion to decrease, and the volume of the reservoir zone portion to increase.

22. The device of claim 20, further comprising:
   means for introducing energy into the exclusion zone, the introduction of energy increasing the electrical potential.

23. The device of claim 20, wherein the polar solution is free of solutes, precipitates, and suspended solids.

24. An electrical energy storage device comprising:
   a dielectric polar solution;
   a first electrode comprising graphene sheets, the first electrode being at least partially submerged in the solution;
   a second electrode comprising graphene sheets, the second electrode being at least partially submerged in the solution, at least one of the first and second electrodes being porous; and
   means for modifying a volume of a portion of the solution located between the first and second electrodes, the portion of the solution self-ordering to form an exclusion zone alongside the first electrode that excludes solutes, precipitates, and suspended solids, the volume of the self-ordered portion determining a magnitude of an electrical potential between the first and second electrodes.

25. The device of claim 24, wherein the means for modifying the volume of the portion of the solution comprises:
   means for drawing current from the first and second electrodes.

26. The device of claim 24, wherein the means for modifying the volume of the portion of the solution comprises:
   means for adding energy to the solution.

27. The device of claim 24, wherein the means for modifying the volume of the portion of the solution comprises:
   means for increasing the electrical potential between the first and second electrodes.

28. The device of claim 24, wherein the polar solution is free of solutes, precipitates, and suspended solids.

* * * * *